United States Patent [19]

Sherwood

[11] 3,709,504

[45] Jan. 9, 1973

[54] PHONOGRAPH APPARATUS

[75] Inventor: Henry A. Sherwood, Short Hills, N.J.

[73] Assignee: Lorraine Industries, Inc., Bridgeport, Conn.

[22] Filed: Nov. 21, 1969

[21] Appl. No.: 878,799

[52] U.S. Cl. ....274/10 S

[51] Int. Cl. ....G11b 17/10

[58] Field of Search ....274/1 R, 10 R, 10 S, 9 R, 15

[56] References Cited

UNITED STATES PATENTS

| | | | |
|---|---|---|---|
| 2,043,789 | 6/1936 | Ansley | 274/10 S |
| 2,328,703 | 9/1943 | Becwar | 274/9 X |
| 3,071,380 | 1/1963 | Di Sabatino | 274/10 S |
| 3,000,637 | 9/1961 | Guest | 274/10 S |
| 3,095,199 | 6/1963 | Lane | 274/10 S |
| 3,253,832 | 5/1966 | Tatter et al. | 274/10 S |

*Primary Examiner*—Harry N. Haroian
*Attorney*—March, Le Fever & Wyatt

[57] ABSTRACT

The invention is directed to a semi-automatic record player. The record feed is instituted when the tone arm is moved manually to position its stylus element on the edge of the record which is to be reproduced. One form of the invention provides for the drop of a lowermost record of a stack by actuating the tone arm. A second form of the invention initiates the record drop following a manual movement of the guiding and supporting spindle in a direction axially of the spindle toward the record supporting turntable prior to a positioning of the tone arm. Each form of the invention provides for holding a stack of records prior to reproduction in a position substantially parallel to the record turntable. Further, the components are so arranged that all may be carried within a completely portable carrying case in which they are adapted to be enclosed. The complete unit is self-contained and includes within the casing suitable sound reproducing apparatus, as well as all necessary amplifier components for energizing the sound reproducer in accordance with the record immediately being traced by the tone arm stylus.

1 Claim, 16 Drawing Figures

INVENTOR.
HENRY A. SHERWOOD
BY
Marsh, LeFever, & Wyatt
ATTORNEYS

INVENTOR.
HENRY A. SHERWOOD

BY

March, LeFever & Wyatt
ATTORNEYS

INVENTOR.
HENRY A. SHERWOOD
BY
March, LeFever & Wyatt
ATTORNEYS

INVENTOR.
HENRY A. SHERWOOD

BY

Marck, LeFever & Wyatt
ATTORNEYS

PHONOGRAPH APPARATUS

The present invention is a semi-automatic phonograph apparatus. In the form in which it will be described herein provision is made for stacking a group of records above a driven turntable about a guide spindle and then selectively releasing the records individually and gravitationally to the turnable by the application of a force effective in a direction toward the turntable.

The apparatus herein described can assume different forms. In each of its forms to be described herein it generally comprises a record supporting turntable upon which the records are placed for reproduction. The turntable is driven in any appropriate manner from a suitable drive motor positioned internally of the apparatus. There is a record guiding spindle that extends centrally through the turntable and projects upwardly and beyond the same and has its lower end mounted in a suitable thrust bearing.

In one form of the invention the spindle is normally forced upwardly by an applied resilient force when positioned within the bearing to cause it to protrude through the turntable. A tone or pick-up arm is arranged to swing or pivot to a position such that its pick-up stylus will engage the grooves of any record upon the turntable and with turntable rotation reproduction of the recorded sound is provided from an associated sound reproducer.

The upper portion of the record guide and positioning spindle has a plurality of outwardly extending catches which are normally spring-pressed outwardly and which, in such position, extend beyond the central aperture of the record desired for reproduction, thereby to hold the record above the turntable. For semi-automatic operation a plurality of records in a preprogrammed order (or randomly chosen, if desired) are placed over the outer end of the spindle and then are supported by the catches, thereby to be prevented from dropping directly to the turntable until reproduction is to occur.

The invention will herein be described as a semi-automatic unit which is, in part, manually controlled. Control may be provided by the user or operator using one hand only to control and position the tone arm relative to the rotatable turntable and record and to control thereby the release of a record from a stack to the turntable. This operation in one form of the device also provides through a suitable linking means to release the lowermost record of a supported stack to the turntable where the complete stack is held upon a spindle extending outwardly therefrom. The support is intended to hold the records approximately parallel to the turntable.

The foregoing operation can be achieved by the operator using one hand only and thereby controlling the record release by moving the tone arm.

Since the record to be reproduced is normally rather thin, it is important in each form of the invention that will be disclosed that an appropriate means be provided for maintaining the stack of records suitably supported in substantially parallel relationship to the turntable. In one form of the invention the records are so held by a support or guide which contacts a small arc of the lowermost records on the stack, thereby to preclude its tilting. In another form of the invention, a relatively thick disk of small diameter is fitted over the record support and guide spindle. The disk is sufficiently thick that when it is rested upon the uppermost record of the supported stack it will tend to hold the complete stack in the desired position. When this second form of the invention is used there is a depressible cap or knob placed over the upper end of the spindle. When this cap is pressed downwardly by the operator, using a second hand, moving it against the force of the supporting or other resilient force within the lower thrust bearing, the downward depression of the spindle is sufficient to cause the supporting catches to be moved inwardly in a radial direction to such an extent that a single record can fall from the stack to the turntable. Normally, record supporting spindles are of such type than when a single record is released to the turntable the spindle formation while retracting the catches beneath a central stack are so designed that with each retraction no more than a single record can be released to the turntable for reproduction at any instant. This restriction is because of the normally provided internal structure of the spindle, as will later be explained.

When a record is placed upon the turntable for reproduction, in either form of the device, and the tone arm stylus is permitted to engage the record grooves, reproduction of the recordings is achieved by passing the pick-up signal through an appropriate amplifier to a sound reproducer which is part of the mechanism contained within the composite unit.

Provisions are normally made for playing back records of different character. Normally high fidelity records are reproduced at the rate of 33 ⅓ RPM, but records of small size with a large diameter central opening are usually reproduced at a current turntable speed of 45 RPM, as an example.

This apparatus is capable of providing a speed change in the drive mechanism to effect a sufficiently universal type of operation to permit, by adjustment, both types of records to be reproduced or, if desired, additional speed changes may be introduced through an appropriate motor control to accommodate other record types.

Where records having a larger central opening are being reproduced it is desirable that an adapter structure be placed about the central spindle. This is done and the described record supporting catches on the spindle then extend outwardly from the adapter rather than the spindle itself.

In the form of the invention first described the record release to the turntable is slightly different from the second form so that a movement of the tone arm beyond the periphery of the largest record controls the operation of the record release mechanism forming a part of the record positioning spindle.

The main objective of the invention is to provide what may be termed a semi-automatic record changing operation rather than a fully automatic operation. The semi-automatic device offers most of the advantages of a fully automatic operation but the expense of the construction of the fully automatic unit is avoided as well as the additional force required and thus the sales price to the buying public can be much reduced and battery operation is possible.

Another objective of the invention is to provide a phonograph reproducer device wherein records of various sizes adapted for reproduction at selected speeds, which may be different for different records, can be utilized, it being apparent however that at any particular time the stacked records must all have the same size central opening although in the stacked records the outer record diameter can vary without in any way affecting the operation. The reproduction operation is achieved after one record of a pre-programmed record stack is released by using one hand manually to operate the tone arm so that finally the tracking stylus is placed on the record grooves, after which the tone arm and stylus is carried from a peripheral position on the record toward the record center prior to complete reproduction of the entire record due to record rotation.

A further objective of the invention is that of providing structure whereby, as soon as the operator uses one hand to move the tone arm and stylus away from and then toward the record, the other hand may be used to exert a force manually axially of the guide spindle support to release another record from the stack for reproduction. This is generally analogous to the movement of the tone arm only in the other form of control using one hand only to force the record drop to bring a different record into the path which will be traced by the tone arm.

A further object of the invention is to provide a record reproducing unit adapted to be mounted within a small case for ready transportation. In this form of the apparatus foldable means are provided which are shiftable to a position wherein a portion of the record periphery is guided by such support element. The support element in its second position is adapted to be moved through a selected angular distance, an angles of approximately 90° being preferred. The element in its raised position is adapted to guide the record and to maintain the record substantially parallel to the record turntable prior to any release to a playing position.

At the same time it is an object of the invention to provide means to exchange the record support spindle with its record release mechanism for a short support spindle protruding only for a distance above the turntable sufficient to accommodate a single record and thereby transform a semi-automatic record feed into one which is operated as a purely manually operated unit.

For an understanding of the principles of the invention, reference is made to the following description of typical embodiments thereof as illustrated in the accompanying drawings.

BRIEF DESCRIPTION OF THE DRAWINGS

In the drawing:

FIG. 14 shows generally the relationship between the turntable and the guide spindle and its bearing, together with the spring member normally tending to force the guide spindle upwardly thereby to insure that in its uncompressed condition the catches about the spindle will extend to a position beyond the periphery of the central aperture in each record in order to hold the stack and with the spring compressed by a downward force thereon so that the catches will be withdrawn, as shown also by FIGS. 10a and 13a.

DESCRIPTION OF THE PREFERRED EMBODIMENTS

Figures 1, 2, 3:
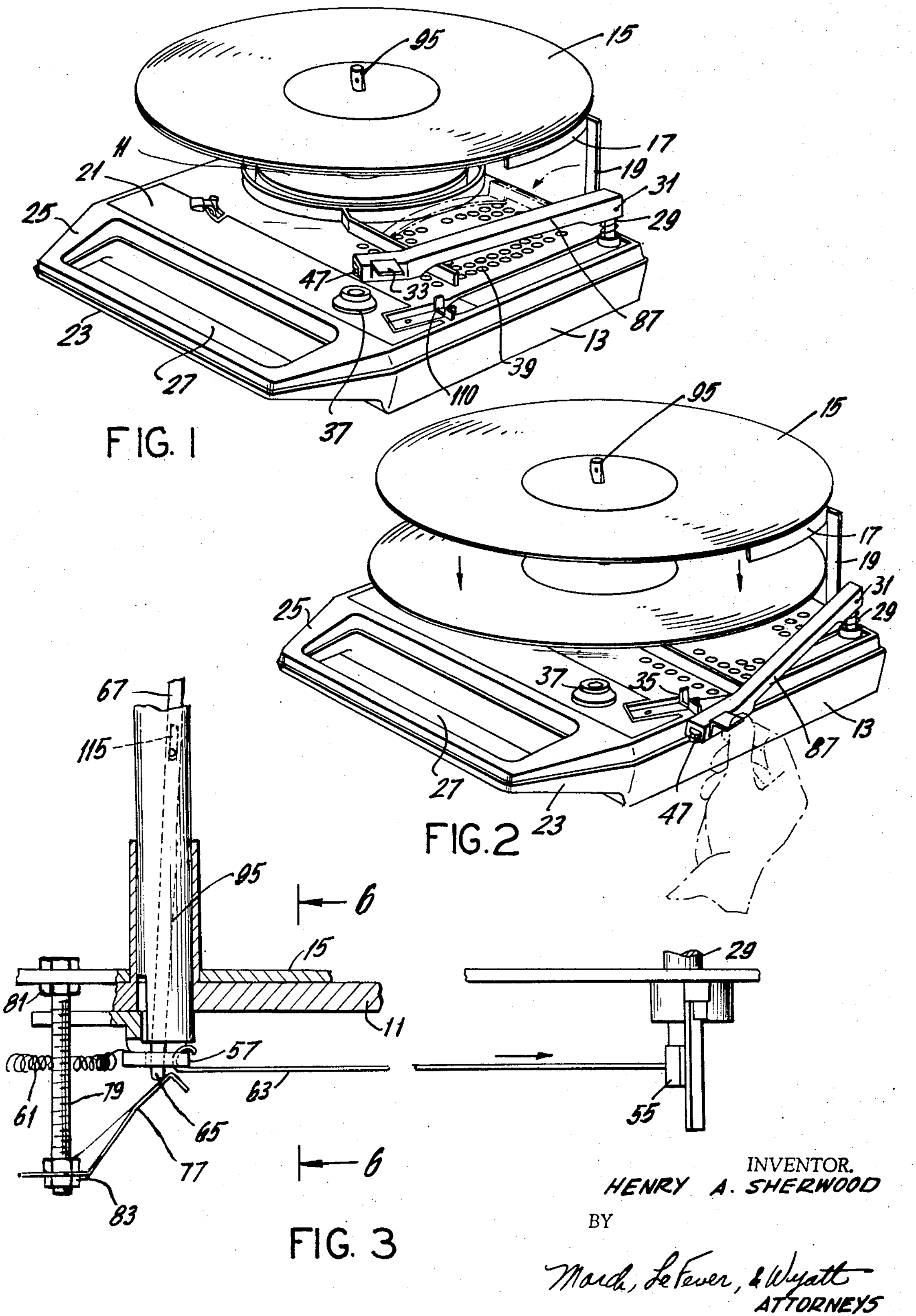
FIG. 1 is a generally isometric view of a modification of the apparatus wherein, after stacking records upon the spindle above the turntable, operation is brought about by means of only a single hand control.
FIG. 2 shows the apparatus of FIG. 1 with a hand control of the tone arm bringing about a release of the lowermost record of the supported stack for release to the turntable.
FIG. 3 is a view, partly in section, to illustrate the linkage or control between the arcuately movable tone arm and the record release components.

Referring first to what may be termed for convenience a semi-automatic type of device as shown in FIGS. 1 through 7, there is shown an assembly or structure which is controllable only under the influence of movement of the tone arm. With this structure the user can control the record drop of the lowermost record of any supported stack with one hand only. In this instance, the tone arm is provided with a connecting means to a suitable control device which releases the supporting catches, such as those depicted at 113 in FIGS. 10 and 10a, or as element 129 in FIGS. 13 and 13a, from beneath the turntable and internally off the supporting base member.

In more detailed consideration the structures of FIGS. 1 through 7, in particular, show the operating components for driving the turntable 11 all contained internally of a base 13. The supported record is indicated at 15 and is of the same type illustratively as that shown at 89 in FIGS. 8 and 9, for example. This structure provides a record positioning component 17 which is arcuately shaped substantially corresponding to a short peripherial curved segment of the record to be reproduced. The short arcuate distance along the record periphery which the guide 17 requires is sufficient in extent to preclude tilting of the record when the record is placed over the outer end of the guide spindle 95.

The arcuate guide member 17 is carried by an arm 19 which is pivoted in any desired fashion (not shown) to a suitable support bracket carried on the upper side of the sub-base member 21 so that, in the absence of records supported on the spindle 95, this guide member may be turned, as indicated by the arrow on FIG. 1, to bring the element to rest against the top of the subbase 21, thereby to enable the playing of single records and to permit a cover to be placed over the tone arm, the turntable and any controls provided therewith.

The base member 13 and the sub-base member 21 have extending therefrom outer sections 23 and 25 which are formed with an opening 27 so that the combination may be considered to provide a handle by which the entire component may be transported. While not shown, a cover may be hinged to the rear edge of the base member 13 and arranged to cover all the components positioned on the top surface of the sub-base 21. Such a cover would provide a section to match with the protruding edges 25 and to form therewith a third element which also would be provided with an opening 27 so that the complete unit may be picked up and carried in an assembled fashion.

The tone arm 87 is supported for hinged movement about the pin 29, which permits the pick-up arm to be moved in an arcuate direction to the turntable about the pin 29 as a center. The tone arm may also be moved, as desired, in an upward arcuate path about a pin 31 as a center, thereby to permit the user by grasping the extension 33 to raise and lower the pick-up arm and simultaneously to turn it above the pin 29 to bring it towards and away from a record groove for sound reproduction, and then to be raised and lowered, to be rested in the clamp 35.

The unit may be provided with a number of switches and a volume control which is conventionally shown at 37. For this purpose it is customary to have electric connecting means extend beneath the tone arm to pass downwardly through the supporting pin 29 which is usually of tubular type so as to connect internally at the base member with a suitable amplifier (not shown) whose output is fed to a sound reproducer (not shown) supported internally at a base member 13 and adapted to be audible through the openings 39 which may be in the form of slots or apertures of any desired size, type, and shape.

With this form of semi-automatic construction the record position is determined by the movement of the tone arm 87 to permit the records 15 to fall to the turntable 11.

Reference may now be made particularly to the structures of FIGS. 3 through 7. In this form of the apparatus the tone arm movement about the supporting tubular section 29 causes a complementary motion of the arm 41 positioned internally of the combination of the sub-base 21 and the base 13. The arm 41 is designed to be clamped to the tubular support element 29 by any desired form of clamping unit, such as the bolt and nut 45. Accordingly, any movement of the tone arm 87 provided by grasping the extension 33 thereof produces similar movement of the arm 41.

Figure 4:
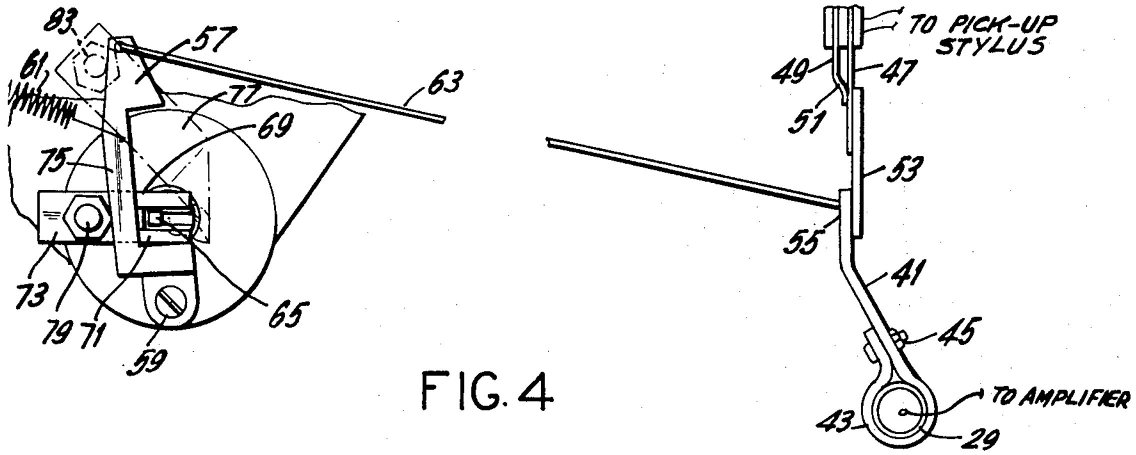
FIG. 4 is a schematic plan view of the record releasing control mechanism looking in an upward direction from the bottom of the unit pictured in FIGS. 1 and 2, with it being assumed that the lower portion of the carrier case is removed, where the diagrammed elements show the apparatus in a record playing position looking in an upward direction.
Figure 5:
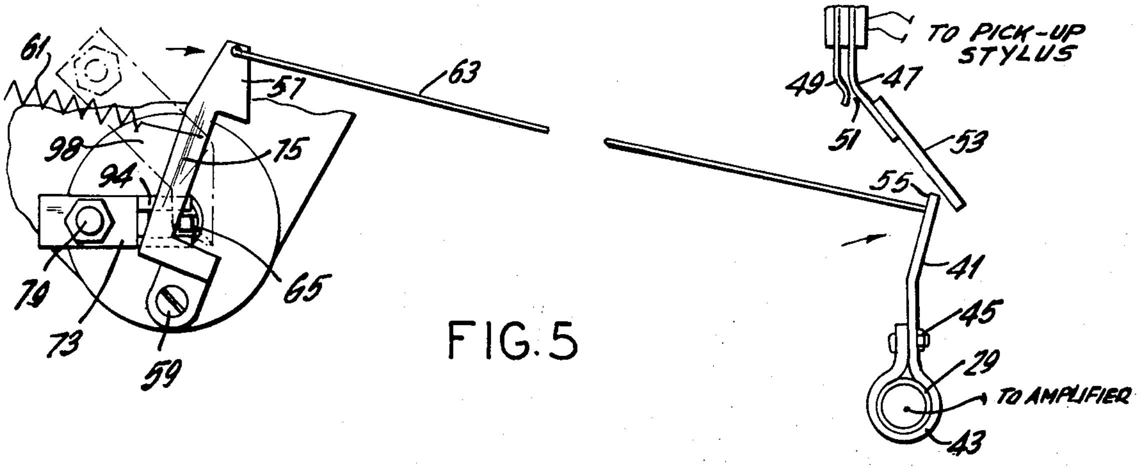
FIG. 5 is a view taken along a generally similar path to FIG. 4 but depicts the mechanism in a record dropping position, where no reproduction of the recording is occurring and where the tone arm is moved outwardly beyond the periphery of any supported record and simultaneously the arm movement opens the circuit to the record reproducing amplifier.
Figure 6:
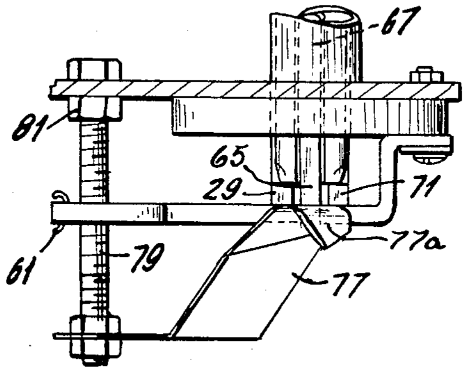
FIG. 6 depicts particularly the record release components whereby records from the stack are released to the turntable.

When the arm 41 and, of course, the tone arm 87 are in a position such that the stylus at the outer end 47 can track the record, sound reproduction is desired but when the tone arm is moved pivotally away from the record (for instance to the position shown by FIG. 2) it is desirable that no connection be made into the amplifier. For this purpose, as shown by FIGS. 4 and 5, the amplifier (not shown but which may be of any desired form) connects to the power source by way of the contactors 47, 49 of the switch element 51. The switch element 51 has one of its switch leaves or contactors extending beneath but fastened to an extension piece 53 which is adapted to be contacted by the outer end 55 of the arm 41. When such contact occurs and the tone arm is moved arcuately it brings the stylus away from the record surface and this movement opens switch 51 to break any connection of the stylus pick-up to the amplifier. A movement of the pick-up arm 87 toward the record surface closes the switch 51 and immediately establishes the desired connection.

The record spindle control lever 75 is pivoted to the sub-base in such a way as to permit arcuate movement about the support pin 59 on a plate 98 as a center. The linkage between the outer end 57 of the spindle control lever and the arm 41 may be through any desired means, although a flexible cable or cord 63 which can be attached to each element is particularly useful, extremely simple, and adequate to establish the desired operation. The pivoted element 75 is normally biased to turn counter-clockwise about the pin 59 under the control of a spring 61 which is suitably anchored to any desired part of the base interior. With this arrangement the lower end 65 of the suitably pivoted record release element 67 held internally of the spindle 95 is normally adapted to be held between the extended tines 69, 71 of a guiding member 73 for controlling the record release from the stack.

Many and various forms of such pivoted release elements are known in the prior art but, as illustrative of one of the type usable for this invention reference is made to the Guest U.S. Pat. No. 3,000,637, where the outer end of a record catch element is moved against a force of a suitable spring to slide the lowermost record of the stack laterally to the limit extent to permit it to drop about a record spindle such as 95 to the turntable platform. With the arrangement herein described, a pull at the outer end 57 of the control lever 75 causes movement thereof in a clockwise direction (looking at FIG. 5) so that the downwardly extending end 65 of the pivoting member 67 contained within the spindle is contacted and moved to the right (from the position shown by FIG. 4) in the forked arms 69 and 71 with extended movement such as would be occasioned by a movement of the pick-up arm 87 to a position shown in FIG. 2. This causes the lower end 65 of the pivoted record release arm 67 to ride up along the curved leaf spring 77 which constitutes a cam and causes the lever end 65 to move in a position to the right from that shown in FIG. 3. With this occurring the supported record can be released by the spindle and caused to drop in the direction shown in FIG. 2 to come to rest upon the turntable 11. Any movement of the pick-up arm in the opposite direction to bring the outer end and the stylus toward engaging direction with the record, of course, releases the force acting on the connecting element 63 and permits the supporting or resilient member 61 to move the arm 75 arcuately in a counter-clockwise direction (looking at FIGS. 4 and 5) and thereby restore the original operating condition.

Continuing with the operational consideration, the lever 67 which penetrates into the lowermost record aperture is pushed to one side and rides up on the leaf spring 77 at about a 45° slope until it reaches the maximum upper point where a record release can occur. The record then drops from the stack to the turntable. This is controlled in some senses by the weight of the remaining records of the stack which moves the release arm 67 downwardly a distance equal to the thickness of a single record.

This causes friction between the release arm 67 and the record stack. To overcome this friction at the release arm 67 which inhibits lateral motion thereof, in order to cause the release arm 67 to enter the record hole in a vertical direction, release spring 77 is advantageously bent at its upper operational end **77*a* so that it biases the release arm 67 simultaneously in a vertical as well as in a lateral direction. Operational end 77*a* of the spring 77 forms a bearing surface which is in a plane positioned in approximately a 45° angle to the vertical axis of the release lever. This bearing surface plane is also parallel to the axis of the pivot point 115 of the release lever 67. The resetting with lateral movement of the lever arm 67 is controlled by the spring 61 and the lever 75. At this time the lever 67** slides back and is biased upwardly to penetrate the aperture of the lowermost record remaining on the stack. One general form of lever structure, although there are others known and usable, is shown by the Guest Pat. U.S. No. 3,000,637 already mentioned.

The general type of operation is further shown by FIG. 7 where the exploded view depicts components hereinabove described in separated relationship for further ease and understanding. The positioning of the various components, as will be recognized from the description above given, is merely intended to be illustrative in FIG. 7 and should not be interpreted that this figure is drawn to scale.

The curved leaf spring 77 constituting a resilient cam surface for biassing the release arm 67, vertically as well as laterally, is supported in any desired fashion from the interior of the sub base by such means as the threaded spindle 79 and the fasting nuts 81 and 83 at opposite ends thereof. Thus, with movement of the pick-up arm in one direction the outer end 65 of the pivoted release arm within the record guiding spindle is moved in a fashion suitable for releasing a record to the turntable and a movement of the pick-up arm in the opposite direction moves release arm 67 in the opposite direction against the force of a spring or some other suitable element (not shown, but illustrated in the Guest patent above named), and also the combined horizontal and lateral forces of the leaf spring 77, so as to restore the record holding position.

Figure 7:
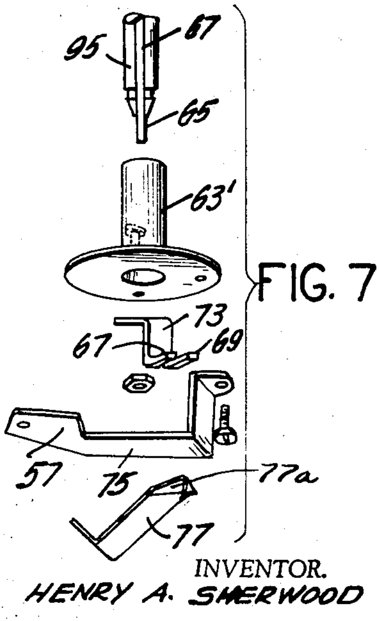
FIG. 7 is an exploded view to illustrate the components of the record release mechanism as controlled by the units pictured in FIG. 6.

Reference is now made to the exploded view of FIG. 7. The positioning of the various components will be appreciated from what is above described, although it can be recognized that this is shown merely illustratively to explain the preferred operation.

The spindle 95, which extends through a sleeve 63; may be exchanged for a short stub spindle where automatic operation is not desired.

Figure 8:
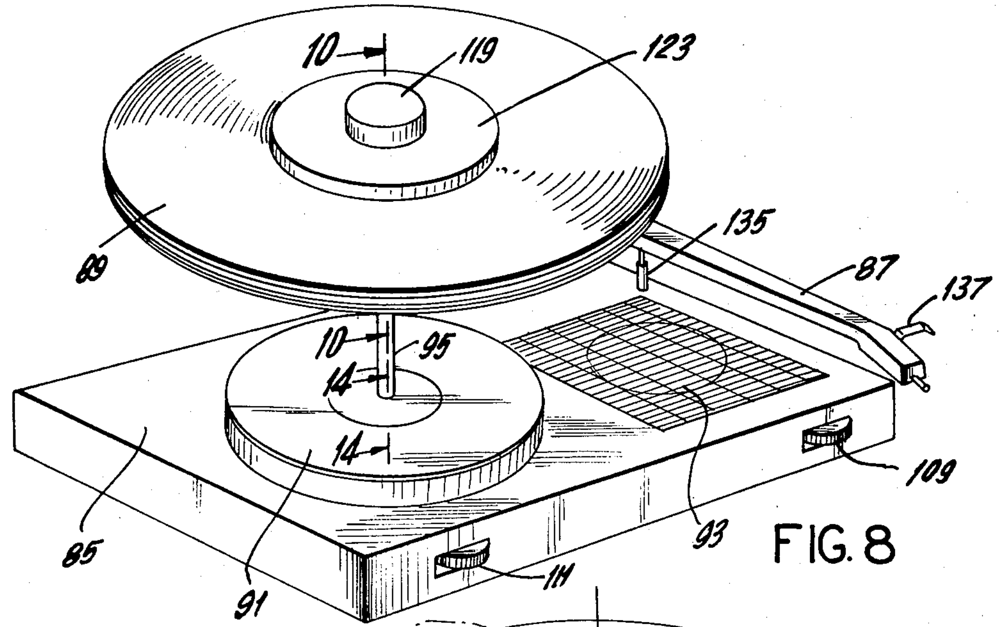
FIG. 8 is a generally isometric view showing in one form the relationship of the turntable upon which the records are adapted to be rested, the tone arm with its stylus, the record positioning spindle, the record stack for reproduction held above the turntable by the spindle catches and the disk means about the record spindle for holding the record stack in a position substantially parallel to the turntable at all times together with the knob which on the one hand is adapted to be depressed to release the record from the stack individually to the turntable and, on the other hand serves as a spacer for single 45 RPM records.
Figures 11, 12:
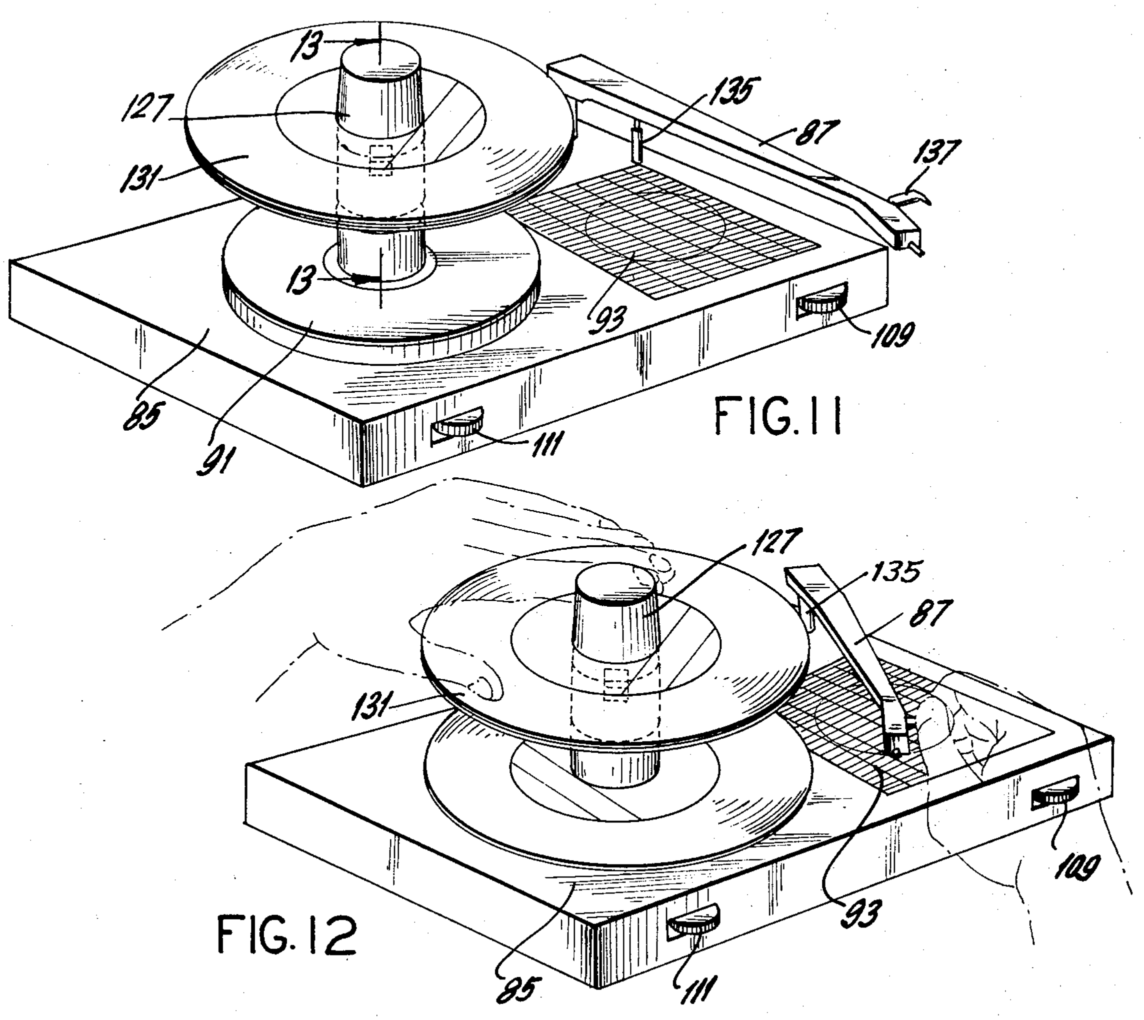
FIG. 11 is a view substantially like FIG. 8 but showing the apparatus with a spindle adapter used to enable reproduction of a different size record from that shown by FIG. 8.
FIG. 12 is a figure substantially like FIG. 9 but also providing for reproduction of small size records with large central openings.

FIG. 8 schematically illustrates the supporting housing 85 a base member within which is contained (but not shown) a suitable drive motor for rotating the turntable, a suitable amplifier for amplifying the signal provided by electrical effects which result when the stylus member of the pick-up arm 87 traces the track of any record 89 supported on the turntable 91 for reproduction. The amplifier feeds into a sound reproducer (not shown) which is positioned beneath the grill 93 on the base member. With this arrangement the pick-up arm 87 is positioned in pivotal fashion about a support post 135 (see FIG. 12) so that it can be moved manually to contact the edge of the track portion of the record 89 (see FIG. 9) which then is turned on the turntable 91, relative to the stylus of the pick-up arm with rotation of the turntable 91 about the record supporting spindle 95.

Figure 14:
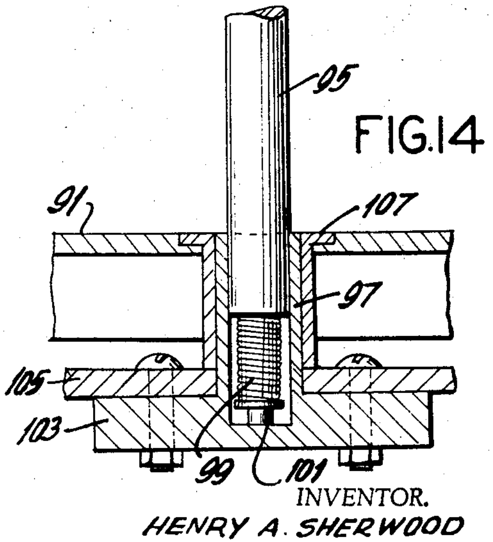

The record supporting spindle 95 extends through the turntable and into a sleeve 97 of a thrust bearing member including a flange 103 (see FIG. 14). In such position it is normally pressed upwardly by means of a coiled resilient or spring element 99 resting upon the bottom portion 101 of the thrust bearing. The thrust bearing is secured to the base member 105. Turntable 91 is mounted on turntable bearing 107 which rotates its sleeve about thrust bearing 97.

A suitable volume control and switch 109 for the amplifier (not shown) is schematically illustrated and schematically shown. Control 111 is the speed control.

Figure 9:
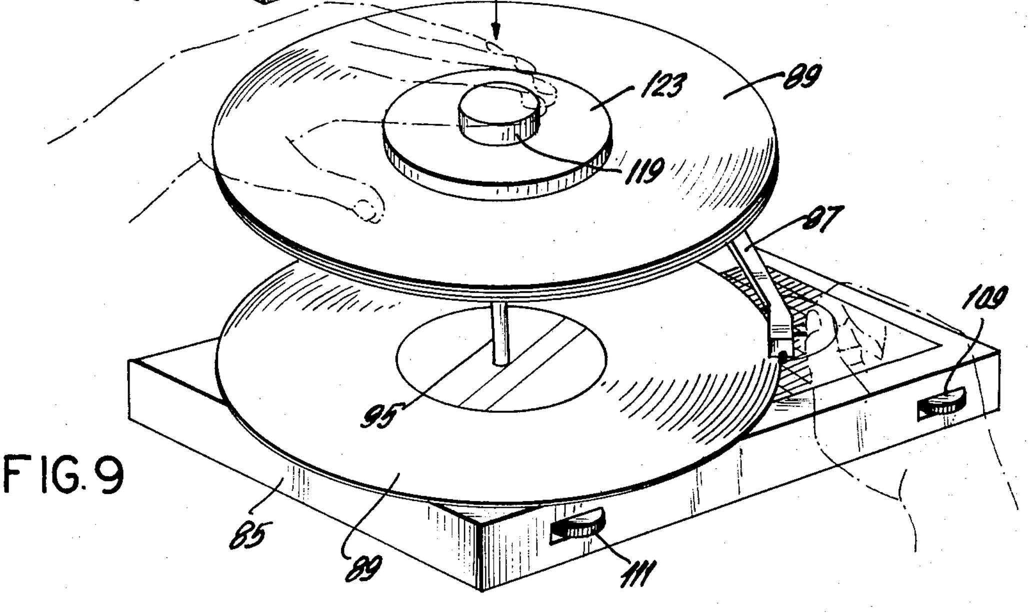
FIG. 9 is another substantially isometric view with the hands of the user shown in phantom to indicate on the one hand the positioning of the tone or pick-up arm and its reproducing stylus on the record, for example, by the right hand, with the user's left hand also shown in phantom and used to produce a force to release an individual record, that is, the lowermost, from the stack to the turntable.
Figure 10:
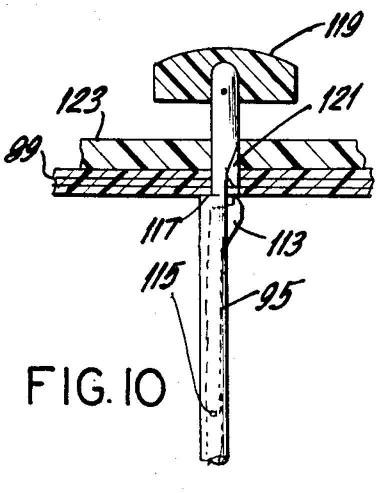
FIGS. 10 and 10*a* are sectional views taken on the line 10—10 of FIG. 8 with FIG. 10 showing the record guide spindle with the supporting catch extending outwardly therefrom to hold a stack of records and with FIG. 10*a* showing the record release element depressed against the force of a spring mounted within the spindle support bearing (see FIG. 14) to retract the spindle catch and, at the same time, by reason of the spindle construction prevent more than a single record dropping to the turntable.
Figure 10A:
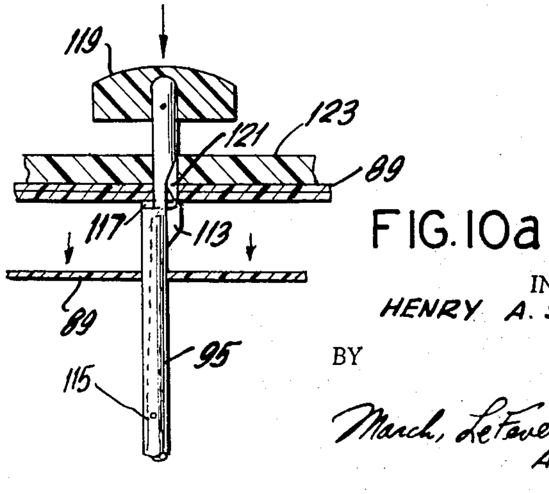

Continuing with reference to FIG. 8, the spindle 95 may be of the well known type such as that indicated by FIGS. 10 and 10*a*. In this form of construction a pivoted catch member 113 is fastened within a slot in the upper portion of such spindle. The catch member 113 is arranged to pivot about a pivot point 115 to move from the position shown in FIG. 10 to that of FIG. 10*a*, releasing a record from the stack 89 supported by the spindle 95. In well known manner the lowermost of any stacked and supported records on the spindle is shown by FIGS. 10 and 10*a*, is moved laterally by the motion of the catch member 113 and then drops along the spindle 95 to come to rest upon the turntable, as shown by FIG. 9.

The upper portion 117 of the spindle then retains all records and supports them prior to the time of subsequent release. The arrangement of FIG. 8 as is more particularly exemplified by FIGS. 10 and 10*a*, is such that a hand-operated or depressible knob 119 may be placed about the upper portion of the spindle in order that a downward pressure thereon may depress the entire spindle in the direction shown by the arrow. This causes the spindle to move downwardly against the force exerted in an upper direction by a spring or other type of resilient member 99 (see FIG. 14). The downward motion of the spindle urges the catch member 113 to pivot, through a slot therein, about its pivot point 115 to a position internally in the spindle. With this occurring, the upper portion of the catch member 113 shifts the lowermost record 89 laterally to a position such that the upper shoulder 117 of the spindle is no longer effective to support the record on the stack. Consequently, the lowest record on the stack moves to the left (as shown by FIG. 10) until the central hole is aligned with the spindle. At this time the record drops to the turntable, as shown by FIG. 10*a*. It is the downward pressure on the spindle produced through the knob 119 (see FIG. 9) that causes this movement. As soon as pressure is released the resilient member 99 forces the spindle upwardly again and it is ready to release the next record off the stack following a repetition of the above-described activation.

In any operation where a plurality of records is stacked the diameter of the central hole in the record is usually a little larger than the outer diameter of the spindle. Consequently, unless provision is made for record stabilization, the records are apt to tilt and preclude proper functioning of the record release. In this record player this effect is avoided by the use of a reasonably thick disc member 123 which is placed about the upper portion of the spindle beneath knob 119 and caused to rest upon the top record of the stack.

This disc has a central opening which is also approximately that of the upper portion of the spindle. Consequently, because of the thickness of this disc and its fit around the spindle 95, all the records upon the spindle are held in a substantially horizontal position prior to the release in the turntable, as above explained.

Following a record release from the stack whereby the record is permitted to slide downwardly along the spindle 95 to the turntable, the tone arm is then manually moved to the record rim for reproducing the record upon record rotation. The drawing does not show the electric connections since this, per se, is not a direct part of the present invention, but it will be understood that appropriate connections from the pick-up stylus into the amplifier cause the developed signal energy from the pick-up to become effective to control the sound reproducer connected beneath the grill 93.

From what has been explained above it will be apparent that the sections of FIG. 10 and 3 are taken through the structure of FIG. 8 in the fashion shown. Likewise it will be apparent that the spindle support as shown by FIG. 14 is derived from that depicted in FIG. 8 and other figures related thereto along the line 14—14.

In a typical structure shown by FIGS. 8 and 9 it will be apparent that the reproducer is designed to be used with disc records having a small central aperture. As such, these records are customarily driven at speeds of about 33 1/3 rpm or, in the case of old type records, at a speed of 78 rpm.

Many small size records which are reproduced at a turntable rotational speed of 45 rpm are also used to a considerable extent. Such records have a large central hole through which the spindle is positioned to hold the record and guide it to the turntable upon release from the stack. The arrangement of FIGS. 11 and 12 typifies this type of unit. Its operation is substantially like that described in connection with the structures of FIGS. 8 and 9, except that for the purpose of accommodating the large size central aperture record, a conventional adapter unit, 127 is positioned over the normal spindle 95.

Figure 13:
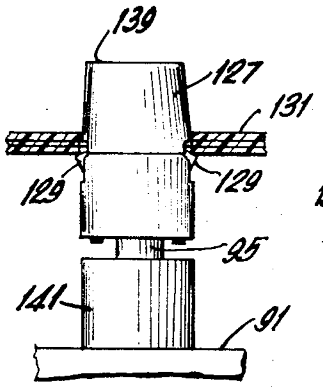
FIGS. 13 and 13*a* are sectional views taken along the line 13——of FIG. 11 and illustrate the manner by which a force applied to the upper cap member above the record stack is utilized to release a single record to the turntable with FIG. 13 showing the records prior to release and FIG. 13*a* showing the lowermost record of a stack released to the turntable.

An adapter of such type is well known and it is formed with its upper section 127 being slightly of frustoconical shape. The records are placed over this section and finally rest against a pair of supporting lugs 129 which extend radially outward from the adapter structure and are pivotally mounted therein so as to be movable in and out. When these lugs are in the outward or extended position, as shown by FIG. 13, they extend beyond the edge of the central aperture in the supported record so that any records positioned above them are held above the turntable. In this instance, such a record, as indicated schematically at 131, is first held by the outwardly extending lugs 129 and release of the lowermost record is a commonly known feature. At such time the lugs 129 are caused to move inwardly by a suitable control. When this occurs, a selector element such as shown at 133 (see FIG. 13*a*) is caused to move between the lowermost record of the supported stack and the record next above it, thereby to support all except the lowermost record which can then slide past the retracted catches 129.

Figure 13A:
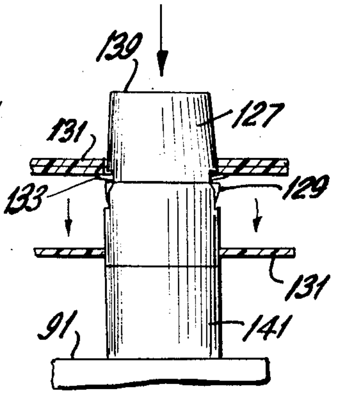

The catches 129 in this instance are caused to move inwardly by a downward pressure exerted on the adapter structure 127 (see FIG. 13*a*). Simultaneously with the inward motion of the lugs or catches 129 the selector slides 133 move outwardly so that a single record only can slide to the turntable.

In this modification the pick-up arm 87 is then moved from a rest position where it is supported upon some suitable support pin 135 (this unit being present also in the structures of FIGS. 1 and 3) so that record reproduction can occur when the stylus the the pick-up arm 87 engages the helical track of the record and produces a signal output in well known manner.

A suitable hand gripping catch 137 is normally used in connection with the pick-up arms in each form of the device, as already explained, these aids enabling the user, whose hands are shown in phantom, particularly in FIG. 5, more easily to position the pick-up arm and its stylus so that the stylus tracks into the record groove.

As can be seen from FIG. 13 and 13*a*, the adapter structure is so formed that, by virtue of the bias of a spring (not shown), in the absence of pressure being exerted upon its top surface 139 the upper portion is resiliently pressed apart from the lowermost section 141, which is fitted over the outer end of the spindle to extend above the turntable 91.

While not illustrated herein it will be appreciated that many forms of mechanisms to drive the turntable 91 may be utilized. One convenient form which is particularly useful connects by suitable means to drive a pulley which rotates internally of the dropped outer edge of the turntable, thereby to provide the desired rotational movement. Other forms of devices to provide for turntable rotation are, of course, well recognized in the art and may be resorted to as desired.

While the invention has been described in two of its preferred forms it is, of course, apparent that other and various further modifications and arrangements may be utilized, provided such modifications fall fairly within the scope of the teachings of this disclosure and/or the scope of the hereinafter attended claims.

What is claimed is:

1. In a phonograph apparatus, having means for semi-automatic operation, of the type including a record turntable drive means operable to rotate the turntable, a disengageable record storage spindle extending centrally upwardly from the record supporting surface of the turntable, record-support means on the upper end of the spindle having catches operable to support a stack of records and to release the records one at a time to descend onto the record support surface of the turntable, and a tone arm swingably mounted for movement into engagement with a record on the turntable record supporting surface: the improvement comprising means interconnecting said record-support means and said tone arm and operable, responsive to movement of said tone arm, to control said catches to release a record to descend to the turntable support surface, plural record storage spindles disengageably cooperable with said record turntable; each of said spindles being adapted for both semi-automatic and manual release of records from the supported stack of records to descend to said turntable record support surface, and further comprising, in addition, a fork-shaped element having the lower end of the spindle positioned on the tines thereof and a record activating lever means for penetrating between the tines to release supported records.

* * * * *